US 9,233,485 B1

(12) United States Patent
Gurin (10) Patent No.: US 9,233,485 B1
(45) Date of Patent: Jan. 12, 2016

(54) LOW ENERGY SLAG AND CEMENT PRODUCTION

(71) Applicant: Michael Gurin, Glenview, IL (US)

(72) Inventor: Michael Gurin, Glenview, IL (US)

( * ) Notice: Subject to any disclaimer, the term of this patent is extended or adjusted under 35 U.S.C. 154(b) by 578 days.

(21) Appl. No.: 13/621,270

(22) Filed: Sep. 16, 2012

(51) Int. Cl.
*B01F 3/04* (2006.01)
*B29B 9/12* (2006.01)
*C04B 18/14* (2006.01)

(52) U.S. Cl.
CPC .............. *B29B 9/12* (2013.01); *B01F 3/04099* (2013.01); *B01F 3/04248* (2013.01); *C04B 18/141* (2013.01)

(58) Field of Classification Search
CPC .... B01F 3/04; B01F 3/04099; B01F 3/04241; B01F 3/04248
USPC ............................ 261/78.2, 76; 106/470, 789
See application file for complete search history.

(56) References Cited

U.S. PATENT DOCUMENTS 2,819,172 A * 1/1958 Trief .............................. 106/789

* cited by examiner

*Primary Examiner* — Robert A Hopkins

(57) ABSTRACT

A slag powder and cement production system capable of utilizing slag immediately after generation as a byproduct of a primary manufacturing process to recover thermal energy of slag concurrently with preparation of slag for cement in a powdered form to maximize energy recovery from primary manufacturing process and to minimize energy consumption to transform slag into a slag powder. Preferably the heat removed from the liquid slag as it solidifies is recovered for useful work, such as sustaining the primary manufacturing process or co-located cement production process and/or electric power production preferably through a supercritical CO2 thermodynamic cycle operating through a heat exchanger less transfer of thermal energy from the slag.

14 Claims, 8 Drawing Sheets

Scenario C

Scenario D

Fig. 7

LOW ENERGY SLAG AND CEMENT PRODUCTION

FIELD OF THE INVENTION

The present invention relates to production of slag powder with net energy production through integral waste heat recovery of a supercritical power generation cycle, and subsequent slag powder for cement utilization and more particularly to methods and apparatus for utilizing slag as it is generated to produce a very fine slag powder while recovering as much heat as possible for useful work.

CROSS-REFERENCE TO RELATED APPLICATIONS

This application does not claim any priority over prior patent applications.

BACKGROUND OF THE INVENTION

With the rise of energy and transportation costs as well as increased concerns about greenhouse gas emissions, it is desirable to reduce the energy usage and carbon dioxide production associated with the manufacture of steel and cement, two of the quintessential construction materials of industrialized society, with the former used extensively in applications ranging from transportation to furniture. Current production techniques create steel and slag in one process with slag considered a waste byproduct having no meaningful value. A second and separate process is then utilized to grind the subsequently cooled slag for use as a filler with cement for the creation of a lower cost concrete. Locating both processes in a highly integrated manner at one industrial site such that the by-product of one is fed directly into the other minimizes a range of operating costs including the transport costs to a concrete plant. However, these previously separate processes can be modified such that the heat generated from the primary manufacturing process as embedded in the hot slag—which is typically wasted—is utilized to produce electricity (or mechanical shaft power) for sustaining both processes and for transmission, reducing the monetary cost and environmental impact of producing the materials while generating electricity that might otherwise come from the burning of fossil fuels. Thus, three industries—steel, cement, and power—can be impacted. Steel and cement are revolutionized, while the power industry is enhanced through the reduction of overall energy consumption and maximizing exergy efficiency on a kilowatt-hour basis.

Slag is the partially vitreous by-product of the smelting of metal ores. Its composition varies based on the ore being smelted, but it typically contains metal oxides and silicon dioxide. The smelting of iron ore in a blast furnace, an important step in the production of pure iron and steel, produces slag containing calcium oxide (CaO), silicon dioxide ($SiO_2$), aluminum oxide ($Al_2O_3$), magnesium oxide (MgO), iron oxides (FeO and $Fe_2O_3$), manganese oxide (MnO), and elemental sulfur (S); steel furnace slag, produced as a by-product of iron processing in a basic oxygen furnace or scrap steel processing in an electric arc furnace, contains all of the same compounds as well as phosphorous pentoxide ($P_2O_5$) and elemental iron (Fe). The cooling process affects slag structure and properties. Air-cooled slag is predominantly crystalline and has little or no cementitious properties, making it suitable primarily as a mineral aggregate. On the other hand, quickly quenching molten slag (such as with water) produces granulated slag, which is glassy and exhibits hydraulic properties (i.e., it hardens due to hydration). Thus, ground granulated blast furnace slag (GGBFS) is often referred to as "slag cement", though the term can also be applied to mixtures of Portland cement and ground slag. Expanded slag is similar to GGBFS and is produced by treating molten blast furnace slag with controlled amounts of water, as currently known in the art, in various pit and machine processes, resulting in a material with cementitious properties between those of air-cooled slag and GGBFS dependent on the amount of crystallization.

Historically, slag was discarded as an essential waste of iron and steel production, at least until the beginning of the $19^{th}$ century, when it became commonly used for construction in Europe. Since then, slag cement blends have demonstrated greater consistency, greater strength gains after setting, greater resistance to seawater and other chemical agents, reduced expansion, higher compressive and flexural strengths, and lower permeability compared to ordinary Portland cement (OPC). Because they are made of a recycled material, slag cements also reduce energy consumption and greenhouse gas emissions.

Olivine and serpentine are magnesium-iron minerals with the ability to adsorb (i.e., weakly bind) carbon dioxide ($CO_2$) when heated to within a certain temperature window as known in the art. The carbonation reaction is an equilibrium reaction, such that the amount and rate of carbon dioxide adsorbed by the mineral is a function of both temperature and pressure. At supercritical pressures for carbon dioxide, a peak adsorption level occurs at approximately 200 degrees Celsius to 300 degrees Celsius, as known in the art. The carbon dioxide adsorption is an exothermic reaction. This unique property allows both minerals (olivine and/or serpentine, with the minerals in slag) to be utilized for carbon sequestration and/or carbon dioxide emissions avoidance respectively to combat global warming. By incorporating either or both of these minerals into a slag cement blend and heating the mixture during processing, the cement itself functions as a carbon dioxide reservoir, making the cement eco-friendly not only by recycling waste from steel production, but by allowing the removal and permanent storage (at least on a geological time line, as compared to "pumping" it into the ground) of additional carbon dioxide from the atmosphere.

WO 2006/123921 and US Patent No. US 2008/0168928 both titled "Concrete Composition Containing Atomized Steelmaking Slag And Concrete Blocks Using The Concrete Composition" by Oh et. al., discloses the production of atomized steel making slag balls to replace fine aggregates, preferably with a quantity greater than 30% replacement of known in the art fine aggregates. Furthermore, '921 utilizes slag balls created using "high-pressure gas mixed with water spray(ed)". The utilization of water (understood to become water vapour) in the quenching process is fundamentally different than the disclosed invention which is preferably void of water vapour.

Furthermore, and importantly, the resulting atomized steel slag balls are also differentiated from the disclosed invention as the slag balls are a non-reactant filler for fine aggregates. '921 also does not enable carbonated materials to be incorporated at high levels in the resulting cement or concrete.

WO 2007/145384 titled "A Method For Stabilizing Slag And Novel Materials Produced Thereby" by Oh et. al., discloses a converter (of slag) refining process that utilizes high-speed oxygen to remove carbon saturated in molten iron via an oxidation reaction. Typically lime is utilized to supplement the inherent CaO. In the conventional treatment, a large amount of water is sprayed. The resulting free CaO (a.k.a. free lime) tends to produce calcium hydroxide (Ca(OH)2)

when it contacts the sprayed water, is not desired for traditional Portland cement. '384 provides a method to minimize the generation of free lime that reduces/eliminates instability of converter slag that is caused upon cooling. One provision is a method for stabilizing slag that comprises and is dependent on molten slag to fall; subsequent injection of high-pressure gas to the falling molten slag to separate the molten slag into fine droplets; and finally quenching the fine droplets with the injected gas and surrounding atmosphere. '384 not only prefers the rate of mass flow rate of the slag ($J_{slag}$) to massflow rate of the injected gas ($J_{slag}$) to be in the range of 0.4 to 1.7 but specifically does everything possible to ensure the mass flow ratios to not exceed 1.7. One method of '384 to limit the ratio is by preferably utilizing water mist to the slag behind the area of gas injection. '384 also utilizes carbon particles having a sphere-equivalent diameter in the range of 30 to 150 micron injected into the falling molten slag, along with the injected gas (assumed to be containing oxygen, as carbon requires the presence of oxygen in order to oxidize into carbon monoxide or carbon dioxide). '384 discloses "on the other hand, if a greatly smaller amount of slag than the amount of injected gas is discharged, a treatment time is extended and consumption of gas increases excessively, resulting in inefficient and uneconomical treatment. Accordingly, it is essential to set an appropriate rate of discharge amount of slag/amount of injected gas." Again, '384 does everything possible to avoid a mass flow ratio between slag and injected gas greater than 1.7, with specific concern of excessive consumption of gas. This is attributed to their energy consuming injected gas, as compared to the present disclosed invention that is net power producing.

'384 further limits the temperature to less than 1550 Celsius due to a "very fast linear velocity at an outlet of the nozzle, thus making it difficult to maintain desired quenching conditions suitable to restrict phase transformation". '384 does anticipate the inclusion of additive for subsequent exothermic oxidation reactions to increase the slag temperature prior to atomizing. '384 does anticipate an increase in surface area, but is limited to the surface of the resulting slag balls and by explicitly blowing carbon powder along with the gas. This method is suitable only in the presence of oxygen, as an injection gas void of oxygen would simply lead to the carbon powder remaining on the surface of the atomized slag ball thus actually reducing the effective slag exposed surface area and not adding any surface porosity. '384 does further anticipate the utilization of a high mass flow rate of the injected gas, beyond their invention, to increase the surface area by first the creation of smaller particle size (100 micron or less) with subsequent agglomeration to a size of 1 to 10 mm. '384 is net energy consuming, as significant energy is required to produce high-pressure injection gas. '384 requires the molten slag to fall, as the discharged gas from the high-pressure injection gas is not utilized for any other purpose, thus the only objective is for the resulting atomized stabilized slag to fall via gravity. '384 further selects the injection gas from air, nitrogen, argon and helium, all of which have approximately less than 1% carbon dioxide. '384 further views the optimal size of the stabilized slag above the range of 200 micron to 5 mm, as the resulting stabilized slag is simply a replacement for fine aggregates and not a chemical reactant. '384 expansion of injected gas is effectively non-contained, and the slag is falling. '384 has low heat transfer rate, as the gas approximately immediately expands to atmospheric pressure. The injection gas at atmospheric pressure has a relatively low density and a comparably low coefficient of heat transfer. '384 specifically avoids the formation of free lime, and the absence of CO2 limits the formation of carbonates. Furthermore, the formation of carbonates is an approximately slow process due at least in part due to the low pressure of discharge gas (i.e., expanded injection gas) and low concentration of CO2.

U.S. Pat. No. 6,803,016 titled "Device For Atomizing And Granulating Liquid Slags" by Edlinger discloses a jacketed atomizing method that advantageously may be operated in a manner that the propellant jet is fed under supercritical conditions so as to cause its rapid expansion after having left the nozzle, by which the propellant jet is accelerated to supersonic speed. '016 utilizes a jet of combustion off-gases and (water) vapor as the propellant jet while, furthermore, gaseous hydrocarbons are also advantageously used as said coolant. When using these media, it is ensured at a comparatively low pressure that supercritical conditions and hence underexpanded media are fed to the respective nozzle, whereupon a rapid and vigorous expansion will subsequently occur so as to attain the desired supersonic speeds. The condensation of water from a propellant jet comprised of combustion off-gases and water vapor at a substoichiometric combustion results directly in a reducing gas CO+H2, a balance of CO2 that may be reused as a burning gas, to prevent the reoxidation of the iron powder.

In '016 both of the jets are able to impinge at supersonic speed creating a rapid and intensive comminution that is reached with a cloud forming subsequently, in which rapid cooling under a simultaneous rapid volume increase takes place due to the chemical decomposition of the cooling gas. The hydrocarbons of the coolant emerging in the sense of arrow are thereby reacted to CO and H2, said reaction with vapor leading to a doubling of the volume; since both media can be fed supercritically and, therefore, expand rapidly upon emergence from the nozzles, in particular the Laval nozzles, intensive comminution work and, at the same time, rapid cooling of the liquid slag, which leaves the slag outlet opening as a tubular jacket, are ensured. The coolant comprises gaseous hydrocarbons; the propellant jet is fed to the nozzle mouth of the lance under supercritical pressure, and the coolant is fed to the coolant nozzles under supercritical pressure. '016 is fundamentally different from the present disclosed invention through the utilization of water (vapour), does not increase the surface area or porosity of the resulting slag powder, and is not a net energy producer but rather is a net energy consumer for the creation of the supercritical cooling gas.

U.S. Pat. No. 6,082,640 titled "Method For Granulating And Grinding Molten Material and Device For Carrying Out Said Method" by Edlinger discloses a process for granulating and comminuting molten material in which the slag melt is acted upon by compressed water and discharged together with the vapour formed.

The published paper titled "The Basic Study on the Preparation of Steel Slag Cement with Gas Quenching Steel Slag" by Yue Long et. al., strives to utilize traditional gas quenching as a method to reduce free lime (CaO) through size reduction and reduction of crystallization time through relatively rapid quenching. Long et. al., is otherwise traditional cement composition without promoting subsequent chemical reaction in the resulting concrete composition.

Another published paper titled "High volume limestone alkali-activated cement developed by design of experiment" by Alexander J. Moseson et. al., discloses a cement comprising ground granulated blast furnace slag, soda ash (sodium carbonate), and up to 68 wt. % granular limestone. Another approach to ecological cement is that of geopolymer or alkali-activated cement (AAC), which generally use no OPC. Their advantages over OPC may include: (i) drastically less CO2 production; (ii) longer life and better durability; (iii) better defense against chemical attack (e.g. chlorides, sulfates); (iv) rapid strength gain; (v) better performance in marine environments. Moseson et. al., utilized As noted above, four raw materials were used. The first was slag (GGBFS) (St. Lawrence Cement, Camden, N.J.) with a Blaine fineness of 498 m2/kg (as tested by the authors per ASTM C204-07 [29]). Xray Fluorescence (XRF) analysis of the GGBFS was carried out by Arkema, Inc. in King of Prussia, Pa. (Table 1). Second is sodium carbonate, Na2CO3 (Brenntag Pacific, Inc., Santa Fe Springs, Calif.). Third is granular limestone with a CaCO3 content of 89.3 wt. % and a MgCO3 content of 10.7 wt. % (Oldcastle Stone Products, Atlanta, Ga.). The cumulative particle size distribution of the latter is: 23%<75 lm, 48%<150 lm, 68%<300 lm, 100%<1000 lm. Fourth, tap water. Moseson et. al., utilizes standard slag powder as produced by the energy intensive process of grinding GGBFS. This is differentiated by the present invention disclosure as the GGBFS preparation process is energy intensive (consuming power), has traditional reactivity due to moderately low (less than 500 m2/kg) surface area thus requires a higher utilization of slag for an equivalent cement/concrete strength.

In another prior art solution, for the purposes of stabilizing converter slag and reducing the amount of CO2 down to a level satisfying environmental restrictions, slag stabilizing techniques have developed for transforming CaO in converter slag into CaC03 via carbonation using CO2 gas that is blown to the converter slag, as disclosed in: 7th Conference of the European Ceramic Society of 2001, p. 879 (T. Takahashi and M. Fukuhara) [Key Engineering Materials, vols. 206-213 (2002) p. 879; Adv. Cem. Res., 12 (2000) p. 97 (T. Isoo, T. Takahashi, N. Okamoto and M. Fukuhara; Am. Ceram. Soc. Bull., 80 (2001) p. 73 (T. Isoo, T. Takahashi and M. Fukuhara); and Materia Japan, 39 (2000) 7 p. 594 (M. Fukuhara and T. Takahashi). Stabilized slag resulting from the above techniques has been proved to be eco-friendly. However, actually, the conventional techniques have a complex necessity for various troublesome facilities and technical processes such as crushing, compression, molding, etc., which are required for the fabrication of large-sized slag blocks. Accordingly, it can be said that the conventional techniques are impractical and uneconomical.

From AT 406 262 B a method for spraying oxidic slags became known, in which liquid slag was ejected from a tundish via a tundish tube, wherein a lance was introduced into the liquid slag to inject a propellant gas and, in particular, water vapor. The tundish tube provided in the slag outlet of the tundish as illustrated in AT 506 262 B could also be designed in the manner of a Laval nozzle, whereby vapor flow velocities in the supersonic range were observed, too, both due to the supercritical conditions under which hot vapor or water vapor was supplied and due to the subsequent possibility of a rapid expansion. In that known device a slag melt having temperatures of between about 1300° and 1500° C. was, thus, ejected using hot vapor as a propellant, rapid cooling having been effected subsequently within the cooling chamber by the reaction of carbon or carbon carriers with water vapor and the slag heat to carbon monoxide and H2, thus providing reducing conditions.

Thus, a need exists for a system capable of producing steel, slag cement, and electric power simultaneously while reducing the greenhouse gas emissions and overall environmental impact of all associated processes.

SUMMARY OF THE INVENTION

It is therefore an object of the present invention to provide a system for coproducing steel and slag cement without the transportation costs and relatively high energy consumption costs, both monetary and ecological, associated with moving slag from one factory to another, all while generating electricity from heat that formerly went to waste.

The present invention can be implemented in existing steel mills with the construction of additional infrastructure or in future combination steel-slag cement plants. Though the present invention is described with respect to steel production and slag, any metal or glass plant that produces a slag that can be ground to exhibit cementitious properties is substitutable, such as an iron manufacturing plant, and the present invention is intended to cover in the appended claims all such modifications and equivalents.

The mixing of additives with slag in a mixer is intended to create a low-density slag foam despite slag foaming being considered detrimental under the existing prior art during the smelting process. A mixer is any method of producing an approximately homogeneous composition as known in the art. In the prior art, where transportation of slag to a second location was necessary, it is advantageous to minimize foaming as to maximize bulk density and thus reduce transport costs. In the disclosed invention, this foam when solidified would require less work to grind into the slag into either a cementitious powder (or concrete filler), increasing the energy efficiency of the process; in typical slag cement manufacturing, the grinding of the slag requires the most power within the cement/concrete production process. However, when an atomizer is used in place of a grinder, a liquid slag foam is still preferable to molten slag directly from the primary manufacturing process as a smaller particle size is produced. It is understood that the term "atomizer" is broadly used as a method to create solid powders as known in the art. It is anticipated that any method of particle size reduction from a liquid to a solid can be used. Additives to the slag may include, but are not limited to: foaming agents, exothermic reactants, olivine, and serpentine. Foaming agents may include, but are not limited to: calcium carbonate ($CaCO_3$). Exothermic reactants may include, but are not limited to: cellulose; rice hulls, which are made primarily of opaline silica ($SiO_2$) and lignin; and municipal solid waste (MSW). It is preferred that any exothermic reactants contain oxygen atoms, such that combustion air requirements are minimized while also minimizing the creation of char from the combustion of the exothermic reactants. The combustion of the exothermic reactants have numerous benefits including combustion gas byproducts to enhance the foaming of the slag, and counteracting the thermal loss from the slag due to transmission thermal losses between the primary manufacturing process and the subsequent slag cement process. The exothermic reactants enable the slag to first become a higher surface area slag foam through the gasification of the exothermic reactants, and then also to remain a liquid to further enhance/enable the slag foam to be reduced in particle size through an atomizer (thus minimizing grinder energy consumption).

Heat is removed throughout the slag cement production process whenever the slag foam or slag cement must be cooled. It is understood that reference to slag cement production process, slag foam powder production process, and slag powder production process are interchangeable. The removed heat can be utilized elsewhere in the Slag Cement Production System, such as at any preheating points, or it may be used as the high temperature reservoir of any known in the art heat engine (i.e., thermodynamic cycle such as Brayton, Rankine, Ericcson, Stirling, etc.) and so utilized for electric power production.

Powder stabilizers as known in the art are optionally added as the last step of cement production. The purpose of these stabilizers is to control the rate of hydration of the cement. Powder stabilizers may include, but are not limited to: saccharides.

This summary of the invention and the objects, advantages, and features thereof have been presented here simply to point out some of the ways that the invention overcomes difficulties presented in the prior art and to distinguish the invention from the prior art and is not intended to operate in any manner as a limitation on the interpretation of claims that are presented initially in the patent application and that are ultimately granted.

BRIEF DESCRIPTION OF THE DRAWINGS

These and other objects, advantages, and features of the present invention will be more readily understood from the following detailed description of the preferred embodiments thereof, when considered in conjunction with the drawings, in which like reference numerals indicate identical structures throughout the several views, and wherein.

DETAILED DESCRIPTION OF THE INVENTION

The term "slag", as used herein, refers to the partially vitreous by-product of the smelting of metal ores. "Slag foam", which is formed in the mixer of the Slag Cement Production System, is a combination of slag and additive(s). "Slag powder", created in the grinder or atomizer of the Slag Cement Production System, may or may not contain additives in addition to pure slag. If a mixer is not used, the slag powder will not contain additives.

Figure 1:
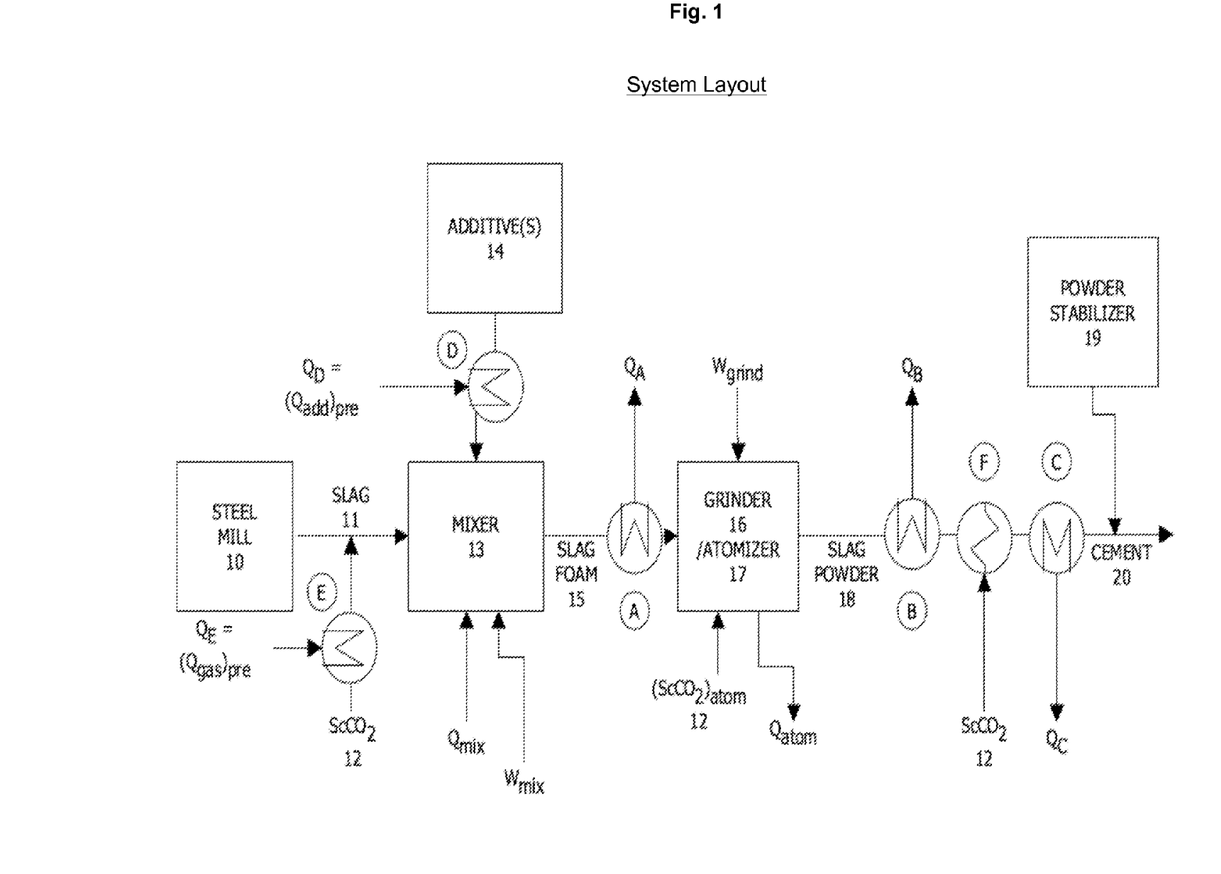
FIG. 1 is a schematic block diagram of major functional blocks of one embodiment of the Slag Cement Production System in accordance with the present invention.

FIG. 1 is a schematic block diagram of major functional blocks of the Slag Cement Production System. A steel mill 10 is shown as the slag 11 source, but it is understood that other forms of slag, such as iron slag or non-ferrous slag, can be used for cement production and would originate in some other type of plant. In this instance, the steel mill 10 is considered the primary manufacturing process. The molten slag 11 is transported into a mixer 13 after possible injection with a gas 12 at point E. This gas 12 is preferred to be supercritical carbon dioxide, denoted as $ScCO_2$, and is so labeled in all applicable figures. The purpose of this injection is to induce foaming of the slag 11, reducing its density and thereby reducing the power consumption required of the mixer 13 and the grinder 16 (when connected) to achieve the desired particle size. It is particularly preferred that the $ScCO_2$ is injected at a temperature significantly below the slag temperature such that the gas expands within the mixer to increase the formation of slag foam. Gas 12 could be directly injected into the slag 11, or both can pass through a bubbler, one embodiment of which is described in FIG. 7. The gas 12 added at point E may also be preheated in order to raise the temperature of the slag 11 and help to ensure it does not solidify in the mixer 13. Heat used for preheating at point E is denoted as either $Q_E$ or $(Q_{gas})_{pre}$. Capital letter subscripts refer to the labeled points in FIG. 1. The definitions of all other subscripts can be found in Table 1.

Slag 11 enters the mixer 13, where additives 14 such as foaming agents, olivine, and serpentine are added, creating a slag foam 15 while controlling the temperature and carbon dioxide concentration of the mixture. It is understood that a wide range of additives are included, though the preferred additives increase the surface area of the slag and/or have an active role in subsequent processes such as the olivine and serpentine adsorbing $CO_2$ from virtually any source and preferably from emissions of the primary manufacturing process. The primary purpose of these additives 14 is to ensure the slag 11 becomes sufficiently foamy to produce particles of the desired size, but they do have other purposes. For instance, cellulose, lignin, and municipal solid waste will combust exothermically in the mixer while releasing oxygen and carbon dioxide, allowing the mixer 13 temperature to be maintained above the slag foam 15 solidification temperature without the combustion of fossil fuels; furthermore, the oxygen helps to sustain the combustion reaction, and the carbon dioxide gas helps to foam the slag 11. It is preferred that exothermic additives 14 contain oxygen for the reason mentioned. Opaline silica ($SiO_2$) and lignin are the primary components of rice hulls, meaning that burning rice heats the slag 11 and strengthens the final cement 20 product. All of the materials mentioned can be obtained as waste products from other processes, minimizing the waste produced by all associated industries. The use of exothermic additives is unique to the invention as waste heat recovery from the slag foam is integral to the slag cement production process.

Calcium carbonate ($CaCO_3$), the primary component of limestone, is also a potential additive 14. The limestone releases carbon dioxide as the limestone ($CaCO_3$) disassociates/breaks down making it a likely foaming agent, and it is cheaply available.

TABLE 1

Figure Notations

| | Notation | Definition |
|---|---|---|
| Quantity | Q | heat |
| | W | work |
| | T | temperature |
| | $\dot{m}$ | mass flow rate |
| Component | gas | gas (preferred $ScCO_2$) |
| | add | additive |
| | mix | mixer |
| | grind | grinder |
| | atom | atomizer |
| | SF | slag foam |
| Modifiers | pre | preheat |
| | solid | solidification |
| | max | maximum |
| | min | minimum |
| | low | lower |
| | high | higher |

Typical appearance: $(QUANTITY_{COMPONENT})_{MODIFIER}$

Figure 4:
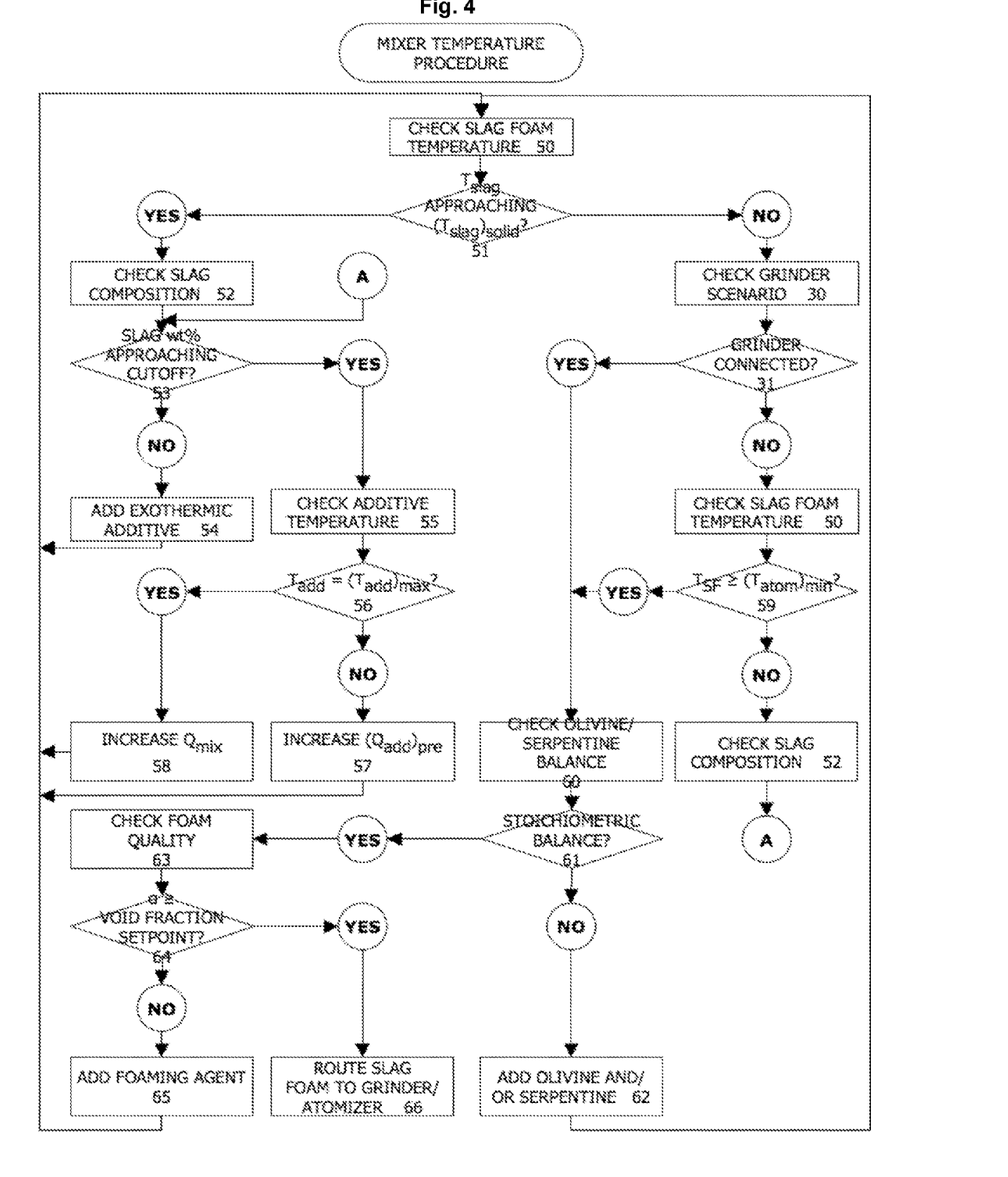
FIG. 4 is a flow chart illustrating the steps of carrying out the Mixer Temperature Procedure in accordance with the present invention.

Olivine and/or serpentine are preferred non-foaming additives 14 and are mentioned in FIG. 4, the Mixer Temperature Procedure. These materials have two primary uses. First, within a certain temperature window, olivine and serpentine readily adsorb carbon dioxide, meaning that the Slag Cement Production System could be used for carbon sequestration. Second, both materials contain silicon compounds, so as they decompose, silicates form in the cement 20, adding strength.

Power and heat can be supplied to the mixer 13 as needed, with heat input denoted as $Q_{mix}$ and work input as $W_{mix}$. This heat can be recuperated from elsewhere in the Slag Cement Production System, or it can be obtained by burning a fuel. Preheater point D is operable to preheat additive 14 entering the mixer 13. Heat used to preheat the additive 14 is denoted as $(Q_{add})_{pre}$, though it can also be labeled as $Q_D$. Both notations are shown in FIG. 1.

The next step in the Slag Cement Production System is either a grinder 16 or an atomizer 17, with the atomizer 17 being the preferred embodiment. If a grinder 16 is used, the slag 15—now a foam—entering the grinder 16 is preferably a solid. In this case, heat removal point A between the mixer 13 and the grinder 16 is activated, with the heat removed denoted as $Q_A$. The magnitude of $Q_A$ is greater than or equal to the magnitude of the heat of solidification (i.e., at least enough heat is removed to solidify the slag foam 15). Additional heat removal will further cool the solidified slag foam 15. It should be noted that slag becomes vitreous if cooled rapidly, so it is preferred that the slag foam 15 solidify within approximately 5 minutes, particularly preferred it solidifies within approximately 30 seconds, and specifically preferred it solidifies within approximately less than 15 seconds.

When an atomizer 17 is utilized, the system does not need to include a heat removal point A. Slag foam 15 ejected from the mixer 13 is injected directly into the atomizer 17 in a liquid state. Gas 12, exemplary as $(ScCO_2)_{atom}$ (i.e., the preferred supercritical $CO_2$ entering the atomizer), is injected in order to spray the slag foam 15, turning it into slag powder 18. This high-surface area powder 18 cools more rapidly into a solid due to its increased contact area with the carbon dioxide. It is understood that the carbon dioxide can be a liquid (i.e., subcritical), a gas, or a supercritical fluid. The atomizing process can be any known in the art metal powder manufacturing process that can tolerate the properties (e.g., viscosity, density) of slag. Heat removed from the atomized slag foam 15 is preferably removed within the atomizer 17 via the gas 12 such that useful work (i.e., via a thermodynamic cycle) is achieved, and subsequently utilized either elsewhere in the Slag Cement Production System or for electric power production on-site, or distributed on the grid as known in the art.

The preferred embodiment of the slag foam and slag powder has a surface area greater than 500 square meter per kg (m2/kg), and preferably greater than 2000 m2/kg. Method as known in the art of increasing surface area beyond 100 square meter per gram are anticipated, when utilized in combination with the preferred integral waste heat recovery and slag powder production method.

After passing through the grinder 16 or atomizer 17, the now-powdered slag 18 passes through a series of heat exchangers at points B, F, and C to further cool the slag powder 18 and remove heat for useful work. As shown in FIG. 1, the heat removed from point B is denoted $Q_B$, and the heat removed from point C is denoted $Q_C$. Gas 12, again illustrated as the preferred supercritical carbon dioxide, passes through the heat exchanger at point F, removing heat (not shown in the figure) for useful work. It is understood that thermal energy can be removed without the utilization of a heat exchanger by direct heat transfer between the slag powder (embedded thermal energy) and the carbon dioxide (preferred gas, being also working fluid within thermodynamic power generating cycle). The solid and gas/supercritical phase of the working fluid are separated as known in the art, including a cyclone.

Furthermore, a powder stabilizer 19 is optionally added to the cement 20. At this point, the slag powder 18 is at a temperature less than that of the decomposition temperature of the specific powder stabilizer 19, and preferably above the melting temperature of the stabilizer 19. Powder stabilizers 19 may include saccharides, which affect the degree to which various cement constituents, i.e., aluminates, silicates, and aluminosilicates, interact with water.

Figure 2:
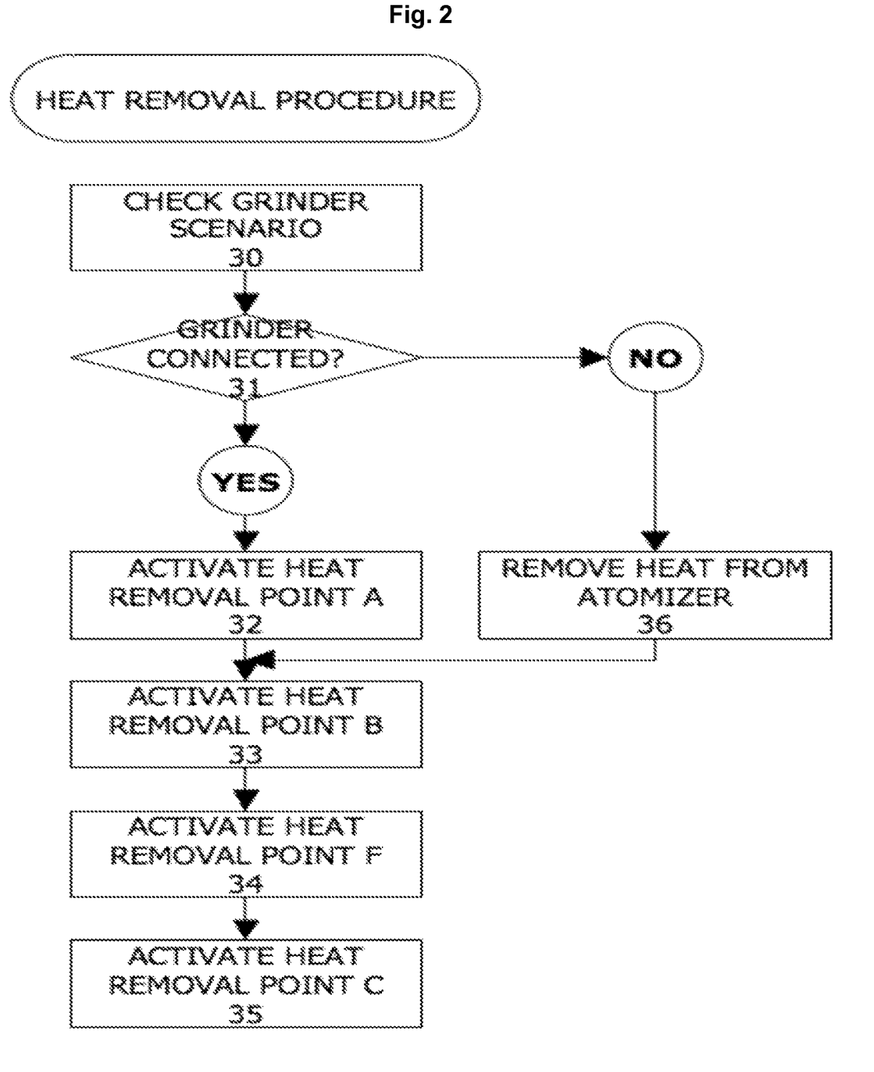
FIG. 2 is a flow chart illustrating the steps of carrying out the Heat Removal Procedure in accordance with the present invention.

FIG. 2 is a flow chart illustrating the steps of the Heat Removal Procedure. The first step is to check the grinder 16 scenario 30, which is done through a decision determining if a grinder 16 is connected 31. In the presence of a grinder, heat is removed from point A 32; or in the absence, i.e., an atomizer 17 is connected and the slag is not a solid, heat is removed from within the atomizer 17 as $Q_{atom}$ 36 following the reduction of particle size from a liquid. Regardless of the first decision, the next three steps are the same: Heat removal point B is activated 33, followed by the activations of heat removal point F 34 and heat removal point C 35. Activating these heat removal points allows the waste heat to be utilized for a useful purpose, either for heating elsewhere in the Slag Cement Production System or for electric power generation. The use of the removed heat is described in FIG. 3.

Figure 3:
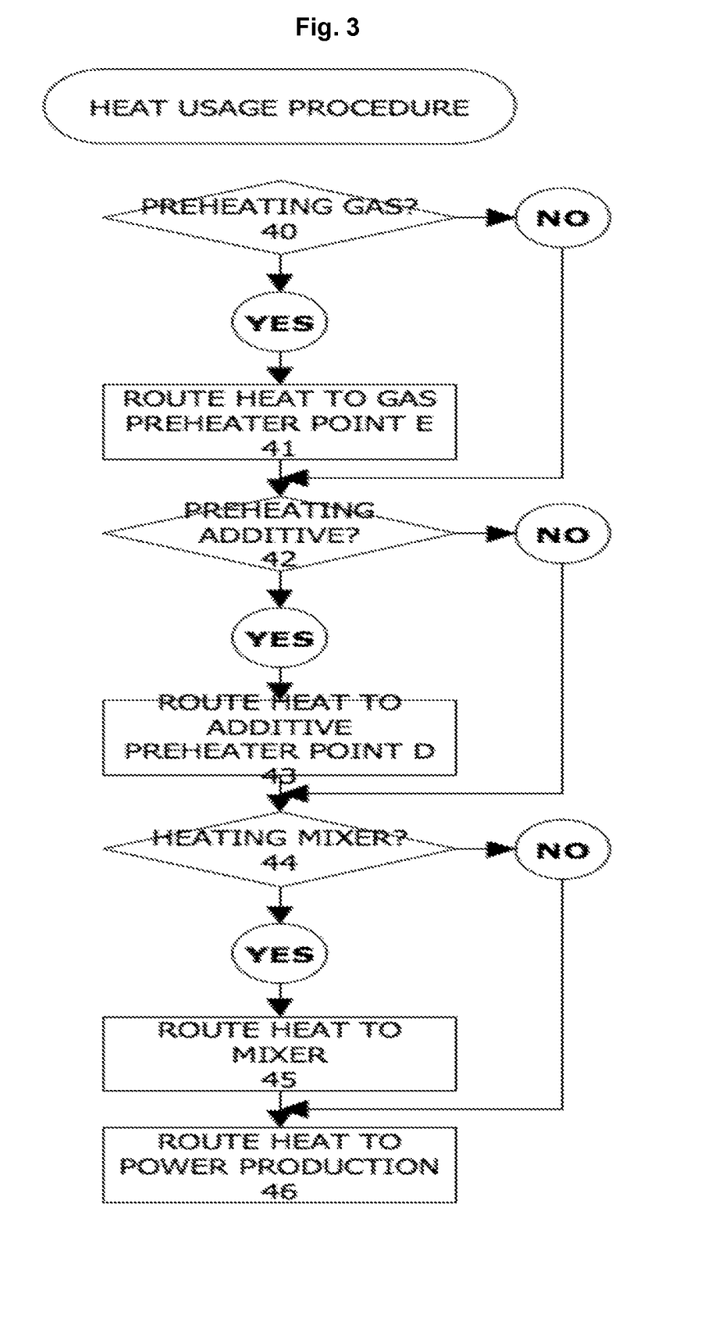
FIG. 3 is a flow chart illustrating the steps of carrying out the Heat Usage Procedure in accordance with the present invention.

FIG. 3 is a flow chart describing the logic of the Heat Usage Procedure. This procedure is run in conjunction with the Heat Removal Procedure (FIG. 2) so that the waste heat of the cement-making process can be utilized for another purpose, maximizing exergy efficiency. The Heat Usage Procedure principally determines which systems are running so that waste heat can be recovered prior to external processes, making the Slag Cement Production System as self-sufficient as possible and reducing the need for external heat sources, such as the incremental burning of fossil fuels to support the powder synthesis process. When a process in the Slag Cement Production System is not being utilized, waste heat is simply utilized by the next process that is in use, or else waste heat is used for power production. When all heat removed during the cement-making process is utilized at some step early in the Heat Usage Procedure so that no waste heat remains for useful work, all subsequent steps in the procedure will be bypassed, and the procedure will effectively terminate.

The first check is whether gas 12 is being preheated 40, which occurs at point E in FIG. 1. In that scenario, the waste heat is routed to the gas preheater point E 41. The next decision determines if additive 14 is being preheated; this decision is also reached after bypassing the preheater point E when the gas 12 is not being preheated. If additive 14 preheating is taking place, heat is routed to the additive 14 preheater point D 43, and $(Q_{add})_{pre}$ is transferred to the additive 14. The final decision is to check if the mixer 13 is being heated 44. Again, this point is reached without heating preheater point D if additive 14 preheating is not required. If the mixer 13 is being heated, $Q_{mix}$ is transferred to the mixer 13. Any remaining waste heat is used for power production 46.

FIG. 4 is a flow chart describing the steps of the Mixer Temperature Procedure used to ensure that the slag foam 15 does not solidify within the mixer 13. This procedure also ensures the slag foam 15 is, depending on the applicable scenario, of a sufficient temperature upon exiting the mixer 13 that it can be solidified before entering the grinder 16 or can be atomized directly from its current state by the atomizer 17. The first step in this procedure is to check the slag foam 15 temperature 50 to ensure it is not close to solidifying. This is done using a decision control point determining if the slag foam 15 temperature, $T_{SF}$, is approaching the slag foam 15 solidification temperature, $(T_{SF})_{solid}$ 51. "Approaching" is preferably defined as within 15% of $(T_{SF})_{solid}$, though it is particularly preferred to be within 11% and specifically preferred to be within 7%. The more preferred ranges are closer to the solidification temperature as a method to reduce energy required for heating the slag foam 15. Though this procedure is designed to bring the slag foam 15 to the minimum required temperature in order to conserve resources, the temperature can be increased above the minimum so that more waste heat can be subsequently removed in the Slag Cement Production System and used for useful work. However, the temperature cannot be raised to the point where heat removal point A cannot ensure the slag foam 15 is solid before entering the grinder 16 or to the point where the atomizer 17 will not function properly.

When the solidification temperature is approached, the slag foam 15 composition is verified 52 to determine the amount of slag 11 relative to the amount of additive 14. This is done in order to select the preferred/optimal method to raise the temperature. The composition determination is made in this procedure by comparing the weight percentage (wt %) of slag 11 to that of additive 14; however, composition could also be measured on a volumetric or molar basis, and the present invention is intended to include all such alternatives. The slag foam 15 composition is compared to an additive-to-slag cutoff ratio 53 set by the manufacturer. This ratio is selected based on the desired qualities, and thus composition, of the final cement 20 product. If the ratio is not approached, i.e., there is a sufficient quantity of slag 11 in the mixture, then an exothermic additive 14 such as cellulose is added 54 before the procedure restarts at the initial temperature check 50. "Approaching" is preferred here to be within 6% of the cutoff ratio, particularly preferred to be within 4% of the cutoff ratio, and specifically preferred to be within 2% of the cutoff ratio. The use of an additive 14 that combusts exothermically virtually eliminates or reduces the incremental combustion of burn fossil fuels, helping to lower costs and minimize environmental impact while eliminating waste from other industrial processes.

When approaching the solidification temperature and the additive-to-slag cutoff ratio, the additive 14 temperature prior to the mixer 13 is verified 55. This is done by comparing the additive 14 temperature, $T_{add}$, to its maximum preheating value 56, $(T_{add})_{max}$, which is defined based on the additive's autoignition temperature, i.e., the temperature at which it will spontaneously combust, and the flow rate of the additive into the mixer 13. Combustion prior to the mixer 13 is less than desirable, and so $(T_{add})_{max}$ is set at a percent level below the autoignition temperature. This value is preferred to be 14% below the autoignition temperature, particularly preferred to be 11% below the autoignition temperature, and specifically preferred to be less than 5% below the autoignition temperature of the additive 14. Of course, a high flow rate may inherently limit the maximum amount of heat transfer so that the autoignition temperature is never approached. If the additive 14 is not at its maximum preheating temperature, the amount of heat used to preheat it, $(Q_{add})_{pre}$, is increased 57 and the procedure begins again; if the additive 14 is at its maximum preheating temperature, the heat supplied directly to the mixer 13, $Q_{mix}$, is increased 58. This heat may be supplied from elsewhere in the Slag Cement Production System or by another method as known in the art.

When the slag foam 15 is not approaching $(T_{SF})_{solid}$, the grinder 16 scenario is checked 30 so the minimum required temperature of the slag foam 15 can be determined. Again, a decision checking whether a grinder 16 is connected 31 is performed. If a grinder 16 is not part of the Slag Cement Production System, the slag foam 15 temperature is again checked 50. The slag foam 15 temperature is compared to the minimum required atomizer 17 temperature, $(T_{atom})_{min}$, which may simply be based on the phase transition temperature (i.e., "freezing", solidification) point of the slag foam 15. If the temperature is insufficient, the slag foam 15 composition is checked 52, and reference point A is reached. Reference point A leads to the corresponding point on the left side of the same figure, just before checking the slag-additive ratio 53, and the procedure continues from there. The purpose is again to determine how to raise the slag foam 15 temperature above the minimum, with a minimal increase in energy consumption.

Once the required temperature for the atomizer 17 is attained, the olivine and serpentine concentration (or other additive) in the slag foam 15 is checked 60. This point is also reached if the slag foam 15 is not approaching its solidification temperature and a grinder 16 is connected; in this scenario, the temperature does not need to be rechecked because it is already assured the slag foam 15 will not solidify in the mixer 13, and so it is at the minimum required temperature. The composition is checked by determining if olivine and/or serpentine are stoichiometrically balanced 61 with the other additives 14. Since olivine and serpentine adsorb $CO_2$ while within a certain temperature range, it is preferable that there be enough of the two substances to adsorb all carbon dioxide produced by the combustion of other additives 14. The amount of $CO_2$ generation can be predicted knowing which additives 14 are used and in what quantity, though in the case of MSW, the composition must also be known. This then enables the required amounts of olivine and serpentine to be calculated. If a stoichiometric balance is not yet achieved, olivine and/or serpentine are added 62 as needed, and the Mixer Temperature Procedure begins again. Once a stoichiometric balance has been achieved, the foam 15 quality can be checked 63. It is understood that a grinder capable of reducing particle size of a liquid would be superior to a grinder requiring solidification.

The resulting slag powder is combined with mineral carbonates including carbonated serpentine and/or olivine at a mass fraction greater than 10%, preferred greater than 30%, particularly preferred greater than 38%, and specifically preferred greater than 55%. The preferred concrete composition has a negative CO2 footprint, through inclusion of mineral carbonated from sequestered CO2. The mineral carbonates are preferably sourced from co-located CO2 emissions in the synthesis of the primary industrial process creating the slag, or co-located in the production of electricity to support the primary industrial process creating the slag.

Slag foam 15 quality is checked by comparing the void fraction a to the setpoint 64, which is determined by the desired particle size of the cement 20, with a larger void fraction corresponding to smaller particle size, without being bound by theory; a larger void fraction also means less work input is required to grind the solidified slag foam 15 in a grinder 16. If the necessary void fraction has not been achieved, foaming agent is added 65, and the procedure begins again. Once the minimum void fraction has been met or exceeded, the slag foam 15 is routed to the grinder 16 or atomizer 17. It is understood that any method of determining slag foam bulk density is acceptable, including microwave, radar, etc.

Figure 5:
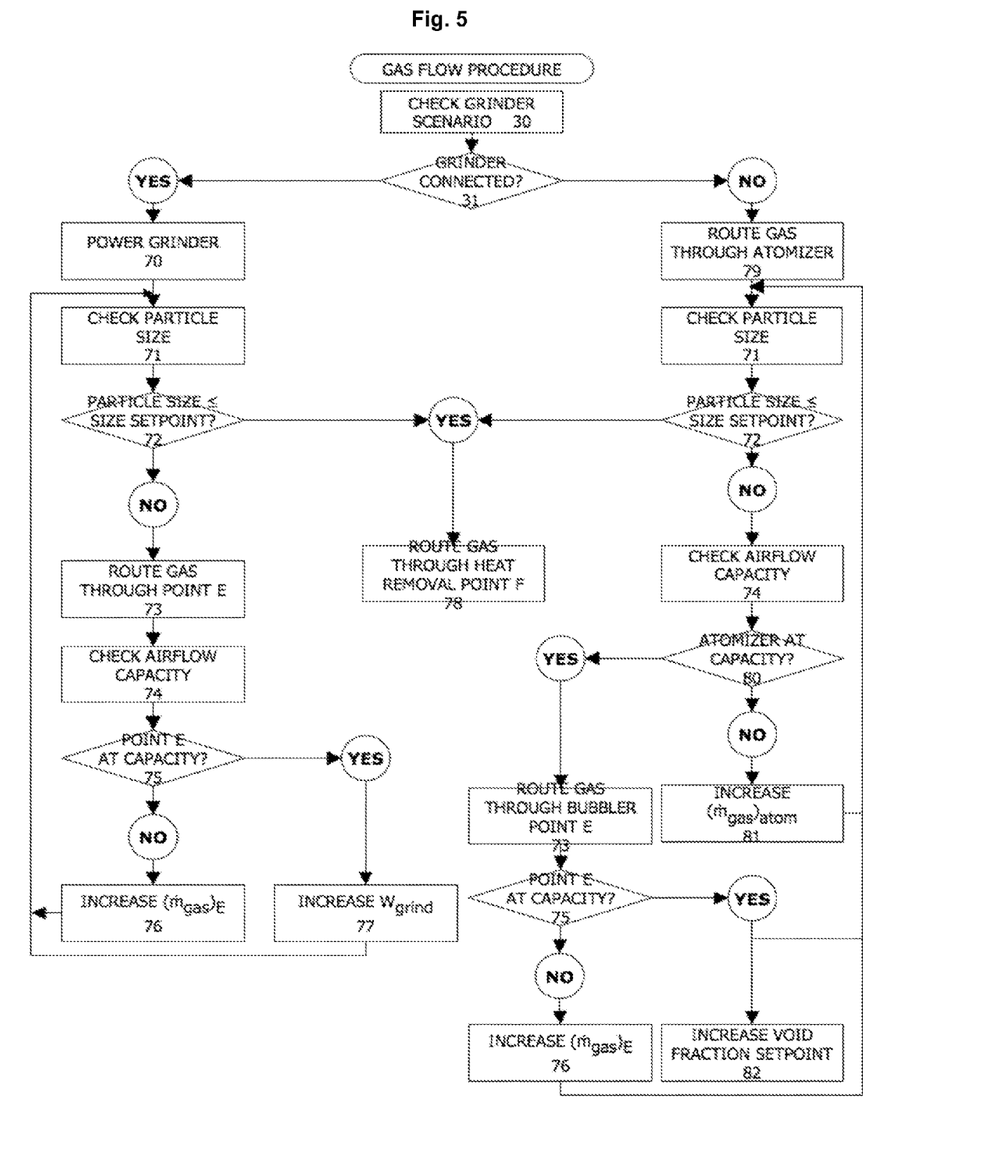
FIG. 5 is a flow chart illustrating the steps of carrying out the Gas Flow Procedure in accordance with the present invention.

FIG. 5 is a flow chart illustrating the steps of the Gas Flow Procedure. The procedure begins with a check to determine the grinder 16 scenario 30, which as before is a decision of whether a grinder 16 is connected 31. If so, the grinder 16 is powered 70 and the slag powder 18 particle size checked 71 by comparing the average particle size to a size setpoint 72 chosen by the manufacturer. If the average particle size is greater than the setpoint, the process must be adjusted by increasing the void fraction of the slag foam 15. In order to prevent cement 20 of inadequate particle size from being produced, which would then require further processing, a controller can be used to predict the particle size of the final product using variables such as the slag 11 composition, the types and quantities of additives 14 in the slag foam 15, the void fraction, and the grinder 16 scenario (i.e., whether a grinder 16 or atomizer 17 is used). Using such a controller, the variables can be altered during the mixing and grinding/atomizing steps, resulting in cement 20 of the desired particle size. In this case, the projected particle size is substituted for the actual particle size in the Gas Flow Procedure, allowing necessary changes to be predicted. Therefore, the term "particle size", as used herein, is understood to also refer to the projected particle size.

If a grinder 16 is part of the Slag Cement Production System and the particle size is too great, gas 12 is directed through point E 73, which may be a bubbler. Airflow capacity is then checked 74, in this case the capacity of point E; this is done by comparing the airflow to the maximum airflow that can be maintained 75, which is limited by conditions such as the maximum pressure and flow ratings of pipes or pumps, as applicable. It is understood that the term "airflow" refers to any gas 12 flowing through point E (not necessarily air), the preferred gas 12 being supercritical carbon dioxide. If the point E is not yet at capacity, the mass flow rate of gas 12 through point E, $(\dot{m}_{gas})_E$, is increased 76, and the procedure returns to the particle size check 71. If the particle size is too large and point E is at capacity, meaning $(\dot{m}_{gas})_E$ cannot be increased, the work put into the grinder 16, $W_{grind}$, must be increased and the particle size rechecked 71. Once the proper particle size has been achieved, gas 12 is directed through heat removal point F 78. The preferred discharge pressure from the grinder 16 is greater than 1200 psi, particularly preferred greater than 2000 psi, specifically preferred greater than 2700 psi.

The utilization of the injected gas both either as a heat transfer "fluid" or working fluid within a power generating thermodynamic cycle, in addition to the atomoizing gas both enables and prefers a mass flow rate of the injected gas to the mass flow rate of the slag is in the range of 3 to 30. The preferred mass flow ratio is in the range of 5 to 25, and the particularly preferred mass flow ratio is in the range of 15 to 25.

If an atomizer 17 is connected to the system instead of a grinder 16, gas 12 is routed through the atomizer 17 first 79. The particle size is then checked 71 by comparing it to the setpoint 72. If the particles are too large, airflow capacity is then checked 74; however, the airflow capacity of the atomizer 17 is checked 80 before that of point E. If the atomizer 17 is not at capacity, airflow through the atomizer 17, $(\dot{m}_{gas})_{atom}$, is increased 81 before returning to the particle size check 72. If the atomizer 17 is at capacity, gas 12 is then also routed through point E 73. A check is then performed to determine if point E is at capacity 75. If not, $(\dot{m}_{gas})_E$ is increased 76, and the Gas Flow Procedure returns to the particle size check 71; the void fraction setpoint is increased 82 if point E is at capacity, meaning that more additives 14 may be included in the slag foam 15. Once a particle size less than or equal to the setpoint is achieved, gas 12 is routed through heat removal point F 78. A core feature of the disclosed invention is the slag production process has integral waste heat recovery, takes place within a volume constrained vessel, utilizes a gas having an inlet pressure of greater than 200 psi (and preferably above the supercritical pressure of carbon dioxide).

Figure 6:
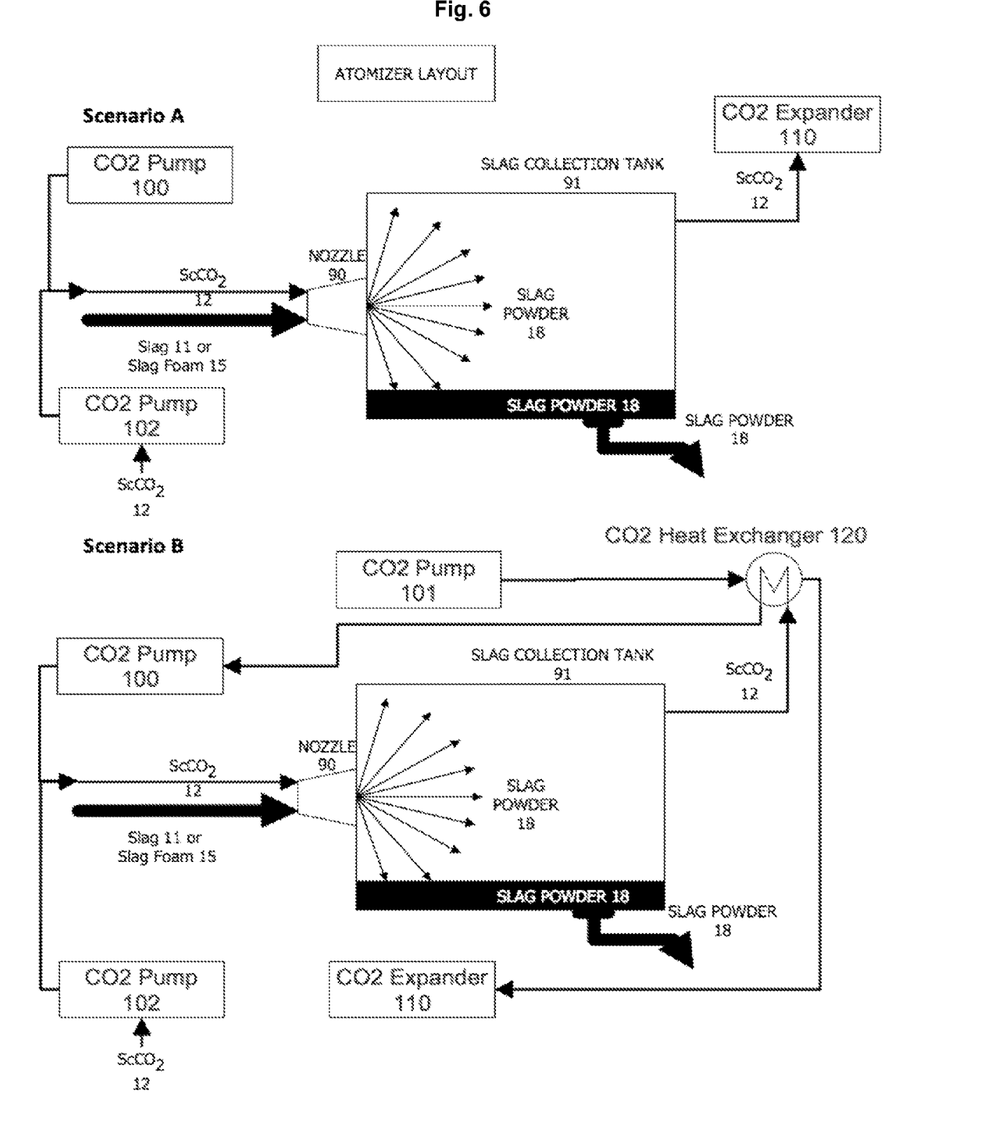
FIG. 6 is a view of four embodiments of an atomizer in accordance with the present invention.

FIG. 6 depicts two possible embodiments of the atomizer 17, though any known in the art metal powder manufacturing technique can be used. One advantage to this embodiment is that no mixer 13 is needed if sufficient quantities of gas 12 are used to propel the liquid slag 11, resulting in a reduction of required power input. Without being bound by theory, assuming the use of supercritical carbon dioxide, if the volume ratio of gas 12 to slag 11 is approximately 20:1, no mixer 13 is required. The preferred volume ratio of gas 12 to slag 11 is greater than 1:1, particularly preferred greater than 3:1, and specifically preferred greater than 10:1. In this atomizer 17 embodiment, slag 11 and $ScCO_2$ 12 enter first a nozzle 90. The $ScCO_2$ 12 propels the slag 11 through the nozzle 90 such that it exits as a slag powder 18 sprayed into the slag collection tank 91. Slag powder 18 collects at the bottom of the tank 91 until it is removed, illustrated by a large arrow exiting the bottom of the tank 91. The slag removal process can be a batch or continuous process. One such process as known in the art of separating powder from gas is a cyclone. The heated $ScCO_2$ 12 is preferably collected from the top of the tank 91.

FIG. 6 Scenario A depicts the atomizer 17 operating as a heat exchanger less (void of heat exchanger) transfer of thermal energy directly to a $ScCO_2$ (it is understood that any non-reactive gas with the slag can be substituted for the carbon dioxide, in so far as the temperature doesn't go beyond the disassociation temperature of the gas) Expander 110. It is also understood as known in the art that filtering methods to prevent any slag from entering the Expander 110, though not shown, can be upstream of the Expander 110. The atomizer 17 is downstream of the carbon dioxide Pump 100 (it is understood that the pump can be replaced with a compressor, turbopump, or turbocompressor as known in the art). Scenario A is the preferred configuration for the disclosed invention.

FIG. 6 Scenario B depicts the atomizer 17 operating as a relatively closed loop heat pipe (preferably oriented as a traditional heat pipe, though with the addition of a makeup CO2 fluid pump 102 (in both Scenario A and Scenario B) to account for any CO2 losses as known in the art). This configuration prevents any contamination from the slag production components with the thermodynamic power generating cycle, with the exception of heat transfer through the CO2 Heat Exchanger 120. The disadvantage is the cost and potential fouling of the CO2 Heat Exchanger 120, and a third CO2 Pump 101 for the thermodynamic power generating cycle. The thermal energy recovered from the slag in the atomizer 17 is transferred through the CO2 Heat Exchanger 120 into the thermodynamic cycle upstream of the CO2 Expander 110. Again, it is understood that the pump can be replaced with a compressor, turbopump, or turbocompressor as known in the art.

Figure 7:
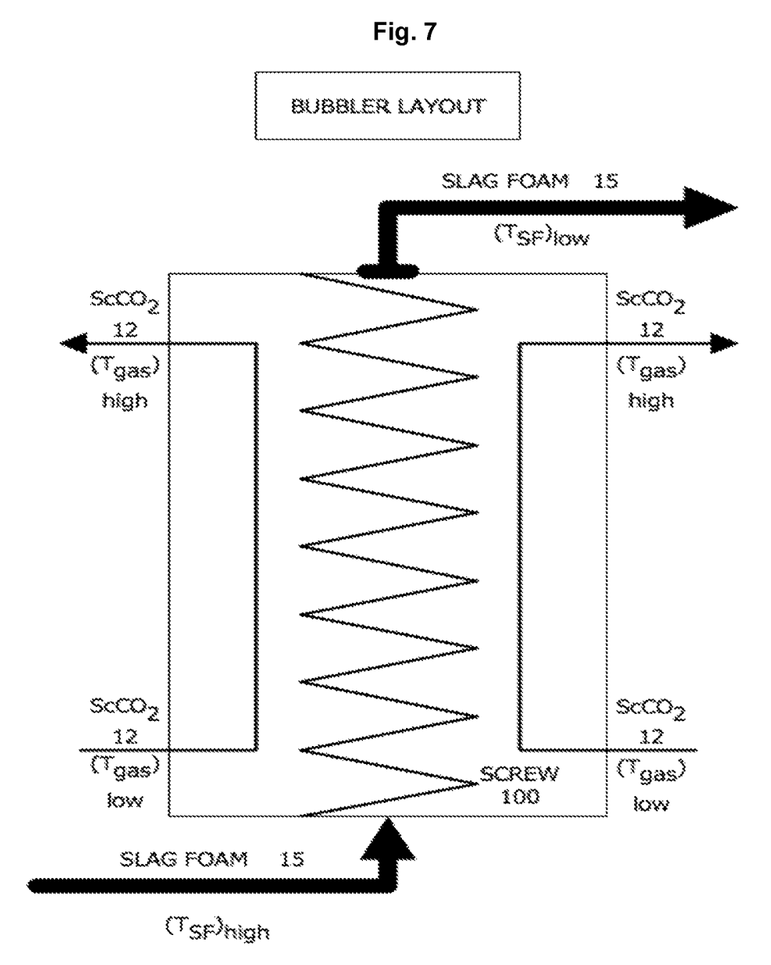
FIG. 7 is a view of one embodiment of a gas bubbler in accordance with the present invention.

Both Scenarios A and B of FIG. 6 are representative of FIG. 7 with the simple substitution of the atomizer with the bubbler. It is understood that FIG. 6 Scenario B can operate as a heat pipe, in which case CO2 Pump 100 operates with a minimal pressure gain between upstream and downstream; or can operate as a traditional pump as depicted that has the advantage of using CO2 gas expansion to reduce by at least 5 percent the agglomeration of slag powder produced in the atomizer 17. It is understood that CO2 Pump 100, though not shown, can have an integral expander stage as a method of recovering mechanical energy from the expanding gas as known in the art.

Scenario C of of FIG. 6 is indicative of a preferred embodiment when the slag production is co-located with any oxy-fuel process, though shown as a supercritical electricity power generation system. One of the most energy efficient methods of creating oxygen is the use of an ionic transfer membrane (shown here as Oxygen Separator 210), as known in the art, which requires a relatively large amount of energy to be consumed for air compression by an air compressor 200 preferably to above the supercritical pressure of carbon dioxide. Given the large fraction of nitrogen (nitrogen rich stream, greater than 70% nitrogen) present in compressed air, this mass portion of the incoming air has traditionally been viewed as wasted energy. In Scenario C, the now compressed nitrogen is ideally suited as the atomizing gas for slag powder production. More waste thermal energy is extracted by the particularly preferred Scenario D that incorporates an Organic Rankine Cycle "ORC" Evaporator 270 to utilize the waste heat, thus enabling more thermal energy to be extracted from the slag, for a third power generation cycle. It is understood that the ORC Evaporator 270 can be substituted with any process that can utilize this waste heat effectively, including preheating of natural gas for co-located industrial or power generation process, or adsorption or absorption cooling. The Natural Gas Compressor 220 increases the pressure to above the supercritical pressure of carbon dioxide as known in the art. The now high-pressure natural gas and oxygen are combined for either internal or external combustion within a Supercritical Combustion 230 chamber for subsequent Electricity Expander 240 to produce electricity. It is understood that the combustion process can take place at a pressure at least 5 psi greater than the Oxygen Separator 210 operating pressure, which would become the minimum operating pressure for the Natural Gas Compressor 220 operating pressure as well. The byproduct of the Oxygen Separator 210 is predominantly nitrogen and shown as Nitrogen or N2 250, as known in the art. The now high-pressure nitrogen is utilized as the atomizing gas (and foaming gas) and concurrently recovering waste heat from the slag and/or slag powder. It is understood that the features of each scenario can be combined to create alternative scenarios, all of which become separate embodiments of this invention. The atomizing portion and the bubbler portions remain the same in Scenario C and Scenario D.

The resulting slag powder production has a significant reduction in electricity usage on a per ton of slag basis as compared to the traditional atomizing method. The disclosed embodiments have a net electricity consumption of less than 18 kWh per ton of slag powder, preferably less than 10 kWh, and specifically preferred less than 5 kWh. The recovery of waste heat integral to the slag byproduct directly yields to further reductions of kWh per slag powder production to less than 5 kWh. The combined features of oxy-fuel in Scenario D yield the more specifically preferred embodiment of a net electricity producer on a per ton of slag powder produced, while yielding a slag powder product that enables the use of carbonates with cement. The net result is a dramatic reduction in CO2 emissions in steel production, cement production, and ultimately concrete. The further inclusion of olivine and/or serpentine carbonation processes enable metal, glass, electricity, oil & gas refinery processes to become CO2 sequestration mechanisms.

FIG. 7 is an illustration of one possible embodiment of a bubbler that can be used to create foam liquid slag 11 or increase the void fraction of slag foam 15. Such a device could be used at point E to inject gas 12 into the slag 11 or at point A to remove heat from slag foam 15 before it reaches the grinder 16. The bubbler is also operable as a buffer, allowing the slag 11 produced in batches in the steel mill 10 to be used in a pseudo-continuous slag cement-making process. It is understood that molten slag 11 may enter and/or exit the device instead of the slag foam 15 appearing in the figure, which depicts a bubbler at point A; liquid slag 11 would simply replace the slag foam 15 at the inlet or at both the inlet and outlet depending where in the system the bubbler is incorporated and how much gas 12 is bubbled through.

Slag foam 15 enters the bubbler from the bottom and is drawn towards the top by a screw 100. As the slag foam 15 rises, ScCO$_2$ 12 is bubbled in from the bottom. Since in this instance the bubbler is assumed to be at point A and the slag foam 15 heading to a grinder 16, heat must be removed from the foam 15. As the ScCO$_2$ rises through the slag foam 15, it removes heat, which is why the ScCO$_2$ is shown entering the bubbler at lower temperature, $(T_{gas})_{low}$, and exiting at higher temperature, $(T_{gas})_{high}$. The slag foam 15 is consequently cooled and is therefore shown entering the bubbler at $(T_{SF})_{high}$ and exiting at $(T_{SF})_{low}$. If the bubbler is used prior to the mixer 13, when it is desirable to heat the slag 11, the gas 12 will enter at a higher temperature and exit at a lower temperature, and the slag 11 will enter at a lower temperature and exit at a higher temperature.

Although particular embodiments of the invention have been described herein in some detail, this has been done for the purpose of providing a written description of the invention in an enabling manner and to form a basis for establishing equivalents to structure and method steps not specifically described or listed. It is contemplated by the inventors that the scope of the limitations of the following claims encompasses the described embodiments and equivalents thereto now known and coming into existence during the term of the patent. Thus, it is expected that various changes, alterations, or modifications may be made to the invention as described herein without departing from the spirit and scope of the invention as defined by the appended claims.

What is claimed is:

1. A slag powder production system comprising: a first non-contained atomizer and an atomizer containment vessel downstream of the first non-contained atomizer, where the first non-contained atomizer and the atomizer containment vessel have an injected gas and slag; wherein the slag has embedded thermal energy, wherein the injected gas into the first non-contained atomizer has an entering and an exiting temperature, wherein the slag into the first non-contained atomizer has an entering and an exiting temperature, wherein the injected gas entering temperature into the first non-contained atomizer is lower than the slag temperature entering the first non-contained atomizer, wherein the injected gas exiting the first non-contained atomizer is heated by the slag embedded thermal energy within the atomizer containment vessel, and wherein the injected gas exit temperature within the atomizer containment vessel is higher than the injected gas entering temperature within the atomizer containment vessel.

2. The slag powder production system according to claim 1 wherein the injected gas is further comprised of carbon dioxide, wherein the system is further comprised of a mineral downstream of the first non-contained atomizer and wherein the mineral has an exothermic carbonation reaction with carbon dioxide.

3. The slag powder production system according to claim 2 is further comprised of a thermodynamic cycle having a working fluid, wherein the injected gas exiting the atomizer containment vessel is the working fluid of the thermodynamic cycle and is heated directly by the slag's embedded thermal energy.

4. The slag powder production system according to claim 2 wherein the slag has a particle size downstream of the first non-contained atomizer, and wherein the injected gas and mineral exothermic carbonation reaction reduces the particle size of the slag within the atomizer containment vessel.

5. The slag powder production system according to claim 2 wherein the mineral is at least one of serpentine or olivine.

6. The slag powder production system according to claim 1 further comprising of foaming additives upstream of the atomizer containment vessel.

7. The slag powder production system according to claim 1 wherein the slag is further comprised of a combusted exothermic additive including rice hulls, cellulose, lignin, municipal solid waste upstream of the atomizer containment vessel and wherein combustion of the combusted exothermic additive occurs within the atomizer containment vessel.

8. The slag powder production system according to claim 7 wherein the slag has a non-contained atomizer entering temperature, wherein the combusted exothermic additive has an autoignition temperature, and wherein the non-contained atomizer entering temperature is greater than the combusted exothermic additive autoignition temperature.

9. A slag powder production system comprising: a first non-contained atomizer having a slag and an injected gas heated by the slag, an atomizer containment vessel to contain the injected gas heated by the slag, and a foaming additive upstream of the atomizer containment vessel.

10. A slag powder production system comprising: a first non-contained atomizer having a slag and an injected gas heated by the slag, an atomizer containment vessel to contain the injected gas heated by the slag, and at least one mineral of serpentine or olivine upstream of the atomizer containment vessel.

11. The slag powder production system according to claim 10 wherein the slag is further comprised of a thermodynamic cycle having a working fluid, wherein the injected gas exiting the atomizer containment vessel is the working fluid of the thermodynamic cycle and is heated directly by the slag's embedded thermal energy.

12. The slag powder production system according to claim 10 wherein the injected gas is further comprised of carbon dioxide, wherein the system is further comprised of a mineral downstream of the first non-contained atomizer and wherein the mineral has an exothermic carbonation reaction with carbon dioxide.

13. The slag powder production system according to claim 10 further comprised of a combusted exothermic additive including rice hulls, cellulose, lignin, municipal solid waste upstream of the atomizer containment vessel and wherein combustion of the combusted exothermic additive occurs within the atomizer containment vessel.

14. The slag powder production system according to claim 13 wherein the slag has a non-contained atomizer entering temperature, wherein the combusted exothermic additive has an autoignition temperature, and wherein the non-contained atomizer entering temperature is greater than the combusted exothermic additive autoignition temperature.

* * * * *